United States Patent [19]

Del Castillo

[11] 4,037,511

[45] July 26, 1977

[54] TEACHING DEVICE FOR ATTACHMENT TO AN ORGAN

[76] Inventor: Juan M. Del Castillo, Risco 119, Mexico City, Mexico

[21] Appl. No.: 645,374

[22] Filed: Dec. 30, 1975

[51] Int. Cl.² .......................................... G09B 15/08
[52] U.S. Cl. .................................... 84/478; 84/481
[58] Field of Search ............... 84/478, 481, 479, 484, 84/477 R

[56] References Cited

U.S. PATENT DOCUMENTS

| 2,897,712 | 8/1959 | Merchant | 84/478 |
| 2,909,956 | 10/1959 | Radcliffe | 84/478 |
| 3,335,630 | 8/1967 | Schmoyer | 84/478 |
| 3,709,085 | 1/1973 | Del Castillo | 84/478 |
| 3,744,366 | 7/1973 | Del Castillo | 84/478 |
| 3,958,487 | 5/1976 | Goldman | 84/478 |

Primary Examiner—Stephen J. Tomsky
Attorney, Agent, or Firm—Karl W. Flocks

[57] ABSTRACT

A teaching device for use with an organ, supported on the upper keyboard, with timed motor means to move an apertured record sheet between a light source and fiber optic connectors which transmit light signals to the fiber optic ends located over keys of the lower chord keyboard and through a sideways extending housing to fiber optic ends located over the keys of the upper melody keyboard in accordance with the placement of the apertures on the moving record sheet.

17 Claims, 4 Drawing Figures

TEACHING DEVICE FOR ATTACHMENT TO AN ORGAN

BACKGROUND OF THE INVENTION

The present invention relates to a device for aiding the teaching of notes to be played and time or duration between them in the study of music and in particular it refers to such a teaching device which may be easily mounted on such an organ or such an instrument having an upper keyboard and a lower keyboard, without any alterations to the internal portions of the musical instrument.

SUMMARY OF THE INVENTION

It is an object of the present invention to provide a teaching device which can be placed on the keyboards of an organ and indicate the proper key to be pressed and the duration during which it is pressed.

It is further an object of the present invention to provide a teaching device for use with double rows of keys as on an organ designating some chord keys and a predetermined number of melody keys in its range of operation.

It is a further object of the present invention that such teaching device be easily mountable upon the keyboard of an organ without any disturbance to the internal positions of the organ, and, in effect, be easily portable and used without change between several similar type keyboard musical instruments.

It is a still further object of the present invention that the control of such indicating means be through use of a record sheet or card having transparent or other form of light transmitting windows or apertures therethrough.

A further object of the present invention is to designate the keys to be played through use of fiber optic connectors from the apertured or windowed card to the keys to be played.

It is also an object of the present invention that a device for teaching the playing of an organ has weight distribution over the keys so that the keys are not played by the weight of the device resting on the keyboard.

Basically the present invention is a device which rests on the keyboard of an organ and processes an apertured card moving through in a position between a light source and fiber optic connectors which have ends lighted over keys to designate keys to be played.

BRIEF DESCRIPTION OF THE DRAWINGS

A complete understanding of the invention may be had from the following description of the particular embodiment of the invention. In the description, reference is made to the accompanying drawings of which.

DESCRIPTION OF THE PREFERRED EMBODIMENT

Figure 1:
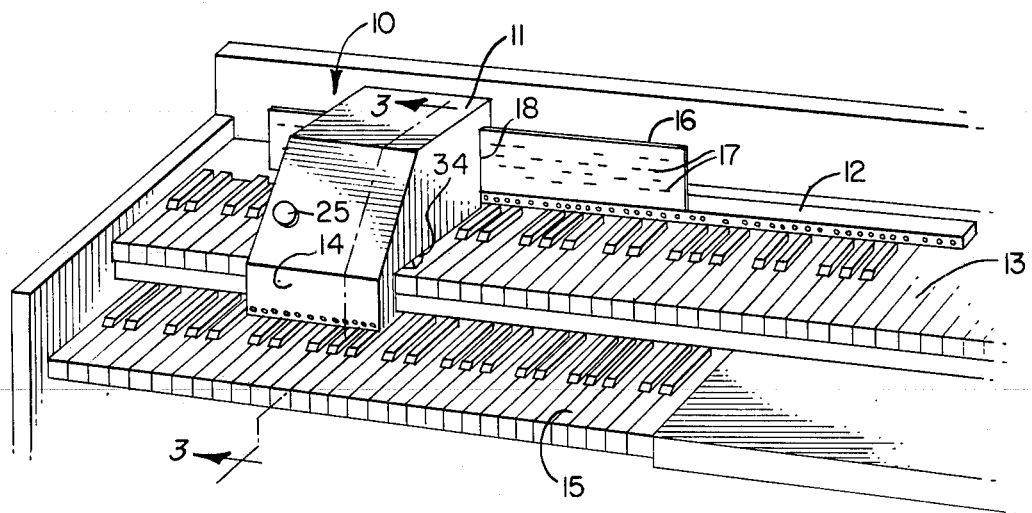
FIG. 1 is an overall perspective view of the teaching device of the present invention seated on an organ keyboard.

Referring to the figures, the teaching device 10 is enclosed in a main housing 11 and an elongated housing 12 extending sideways from said main housing 11 and extending over the back ends of the keys of the upper melody keyboard 13. The front portion 14 of main housing 11 extends down over a few of the keys of keyboard 13 to the backs of keys on the lower chord keyboard 15.

An apertured record sheet 16 having apertures 17 therein passes through main housing 11 by way of entrance and exit slots 18 and 19 respectively. The apertures 17 in record sheet 16 are of various lengths depending upon the amount of time it is desired to hold a key in playing or down position on the organ. The record sheet 16, which could also be a card, is supported by entrance and exit slots 18 and 19 and an additional guide if needed internally in the housing 11, in a vertical position as shown in the drawings. Such record sheet 16 could also be arranged in a horizontal or slanted position with the mechanism positioned to receive sheet 16.

Record sheet 16 is moved through housing 11 in the direction of arrow 20 by means of a roller 21 which may be made of rubber and is mounted to turn on shaft 22 by means of belt 23 connected to the shaft of motor 24. The motor 24 operates in timed relationship to the spacing of the apertures 17 on record sheet 16, with its speed controlled by potentiometer 25.

As record sheet 16 is moved through housing 11 it passes between a light source, shown as lamp 26 and reflecting housing 27, and a panel of fiber optic connector ends 28 with their faces arranged in a vertical row. Each of the fiber optic connector ends 28 receives light from lamp 26 when it is uncovered by coinciding with an aperture 17 and continues to receive light for the duration of the time of this coincidence. This light passes along the respective fiber optic connectors 29 and is seen at fiber optic connector ends 31 or 32 over keys of keyboard 13 or 15 respectively. This lighted connector end designates the key to be pressed and the duration of time during which is should be pressed.

Teaching device 10 with housings 11 and 12 are a single unit with main housing 11 resting on black or sharps and flats keys 33 of keyboard 13 and a rubber or plastic bumper bar 34 extending substantially the full width of housing 11 and resting on the white keys 36 of keyboard 13. The front portion 14 then extends down over the edges of keys 36 to a position over the back of the keys 37 of lower keyboard 15. A bottom rubber pad 38 protects keys 33 and used in conjunction with bar 34 spreads the weight of device 10 over a number of keys. This prevents excessive weight on any single key since sufficient weight on any one key would press that key and keep it pressed and playing continuously. The construction of device 10 as described prevents this from happening.

In the preferred embodiment the width of main housing 11 is such as to cover at least one octave on the keyboard. In this case, the twelve fiber optic connector ends 32 in front portion 14 are equal to the black and white keys of the one octave. Elongated housing 12 may extend approximately, as in this case, three octaves over keyboard 13 but should not be excessively long so as to overlimit the choice of placement on the organ or necessitate too wide a record sheet 16 especially since this sheet moves while in a vertical position in the preferred embodiment. The final decision as to length of elongated housing will of course rest upon the size of the upper keyboard for the organ used.

Main housing 11 will be placed on the keyboard so as to have front portion 14 overhanging the octave including the chords to be played on lower keyboard 15.

Figure 3:
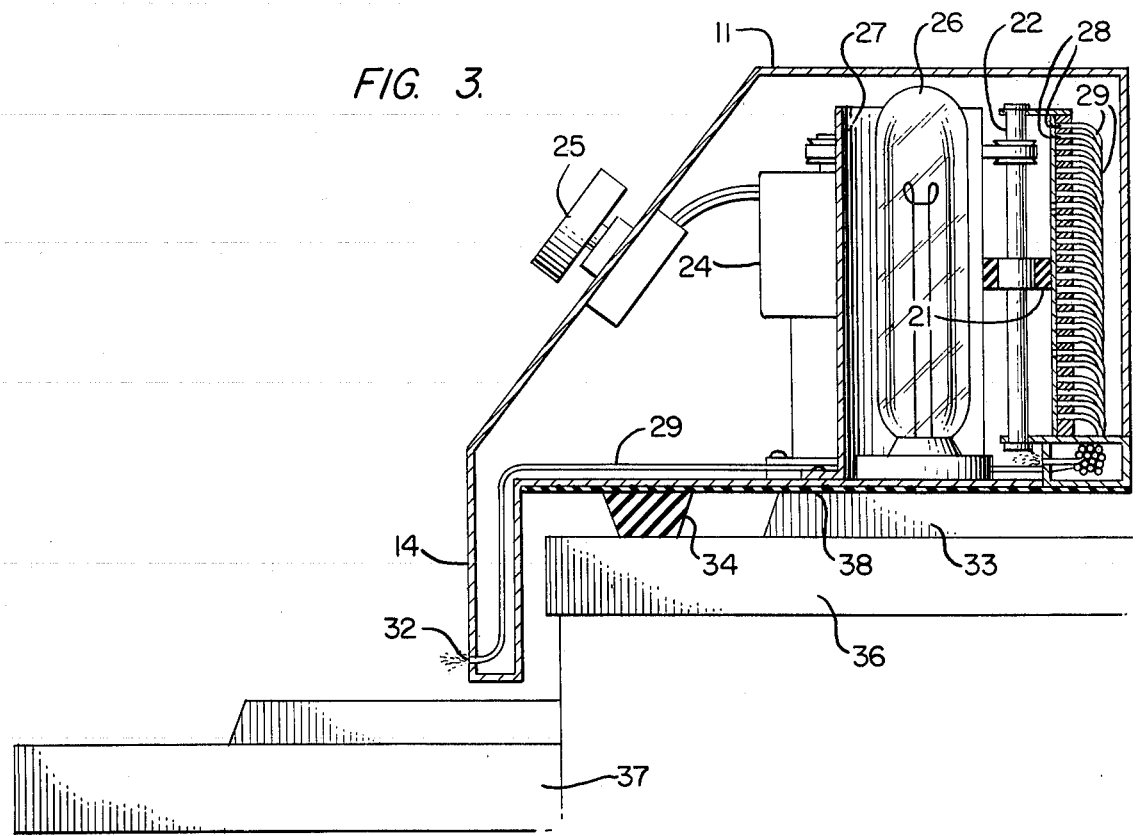
FIG. 3 is an enlarged side elevational sectioned view on lines 3—3 of FIG. 1.
Figure 2:
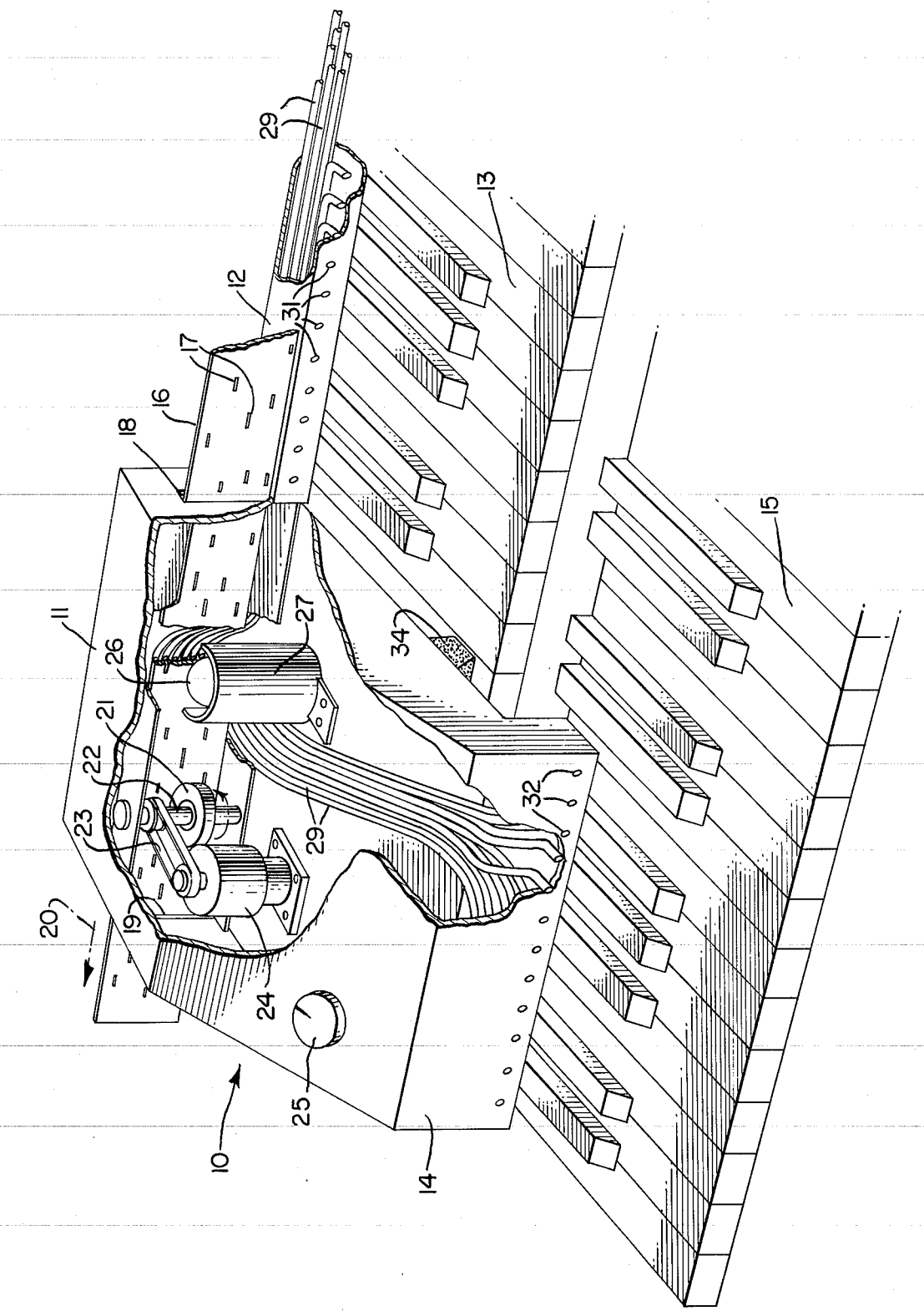
FIG. 2 is an enlarged perspective cutaway view of the device of FIG. 1.
Figure 4:
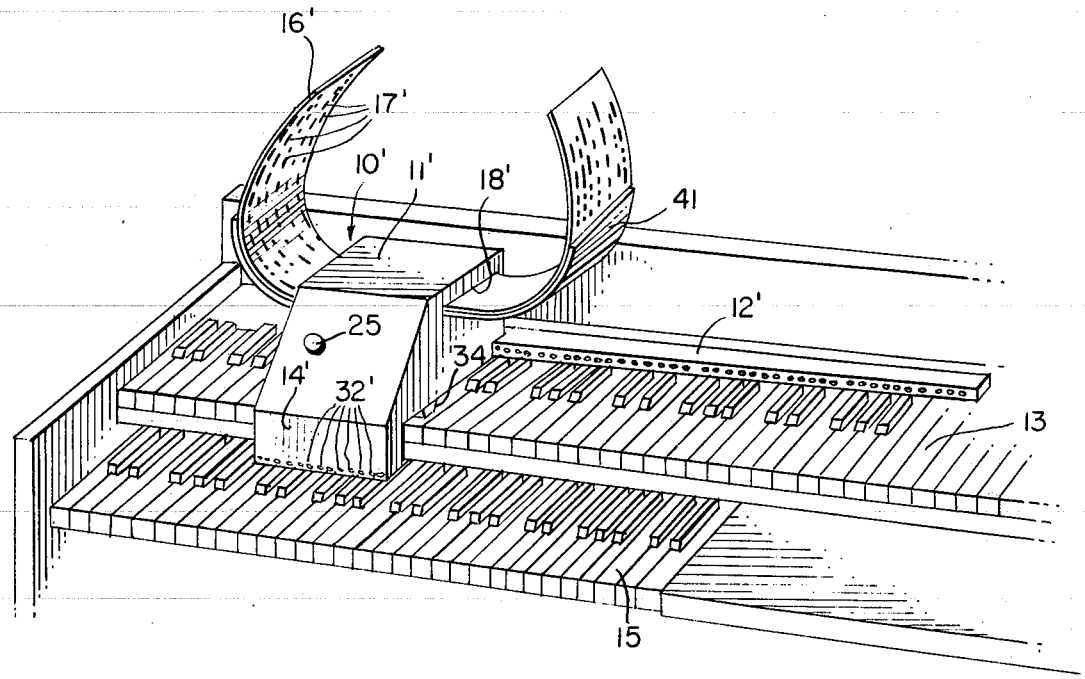
FIG. 4 is an overall perspective view of another embodiment of the invention of FIG. 1.

As mentioned previously the record sheet could be arranged other than vertically as, for example, in the embodiment shown in FIG. 4 where record sheet 16' with apertures 17' run through housing 11' of teaching device 10' in a horizontal position using a metal feed plate 41 extending from entrance slot 18' on one side of housing 11' and from the exit slot on its other side. The apparatus shown in FIG. 3 may be rotated to work in the teaching device 10'. The elongated housing 12' and front portion 14' with fiber optic connector ends 32' would all remain as shown and discussed in connection with the first embodiment of the teaching device 10.

It will be obvious to those skilled in the art that various other changes may be made without departing from the scope of the invention and the invention is not to be considered limited to the preferred embodiment or embodiments as shown in the drawings and described in the specification.

What is claimed is:

1. A teaching device for use with a musical instrument having an upper and a lower keyboard comprising
   a main housing resting on the upper keyboard,
   an elongated housing extending from said main housing and along the rear of the upper keyboard along a portion of the upper keyboard,
   a record sheet having indications thereon in accordance with music to be played on the musical instrument, means to move said record sheet through at least said main housing,
   means mounted in said elongated housing and said main housing in a position to designate in accordance with said record sheet the keys on the upper and lower keyboards which are to be pressed.

2. The teaching device according to claim 1, further characterized by
   said main housing having a portion of said housing over the keys on the lower keyboard including a portion of said key designating means.

3. The teaching device according to claim 2, further characterized by
   said main housing having said key designating means for the lower keyboard for substantially one octave on the lower keyboard.

4. The teaching device according to claim 2, further characterized by
   said key designating means including fiber optic connectors having one end of each of said connectors over each key on the lower keyboard for the width of said main housing and one end of others of each of said connectors over each key on the upper keyboard for the extension of said elongated housing.

5. The teaching device according to claim 4, further characterized by
   said key designating means further including
   a light source,
   the opposite ends of said fiber optic connectors from said ends positioned over the keys aligned adjacent said light source,
   said indications on said record sheet allowing light to pass therethrough from said light source to said aligned opposite ends of said fiber optic connectors.

6. The teaching device according to claim 5, further characterized by
   said indications being non-opaque windows on said record sheet.

7. The teaching device according to claim 5, further characterized by
   the alignment of said opposite ends of said fiber optic connectors being in a single vertical line,
   said record sheet being moved while positioned on its edge so that the sheet stands vertically while being moved by said sheet moving means between said light source and said aligned opposite ends of said connectors.

8. The teaching device according to claim 7, further characterized by
   guide means in said main housing to maintain said record sheet in its vertical position.

9. The teaching device according to claim 8, further characterized by
   said guide means being vertically extending slots in said main housing on opposite sides of said sheet moving means.

10. The teaching device according to claim 5, further characterized by
    the alignment of said opposite ends of said fiber optic connectors being in a single line.

11. The teaching device according to claim 10, further characterized by
    said record sheet being moved while positioned horizontally so that the sheet lies horizontally while being moved by said sheet moving means between said light source and said aligned opposite ends of said connectors.

12. The teaching device according to claim 11, further characterized by
    guide means in said main housing to maintain said record sheet in its horizontal position including
    horizontally extending slots in said main housing on opposite sides of said sheet moving means, and
    feed plates extending outward from said slots in said main housing.

13. The teaching device according to claim 1, further characterized by
    said moving means including
    roller means contacting said record sheet,
    variable speed motor means turning said roller means in timed relationship to the spacing of said indications on said record sheet and the timing of the music to be played.

14. The teaching device according to claim 1, further characterized by
    supporting means on the bottom of said main housing to distribute the weight of said housing over a plurality of keys.

15. The teaching device according to claim 1, further characterized by
    supporting means on the bottom of said main housing to distribute the weight of said housing over a plurality of keys of the upper keyboard.

16. The teaching device according to claim 15, further characterized by
    said supporting means including
    a bottom portion of said main housing extending over a plurality of keys of the upper keyboard and adapted to rest on the black keys of the upper keyboard,
    a bar means attached to said bottom portion extending over a plurality of white keys of the upper keyboard and adapted to rest on the white keys of the upper keyboard at a location forward of black keys of the upper keyboard.

17. The teaching device according to claim 16, further characterized by
    said bar means extending substantially for the width of said main housing.

* * * * *